Patented Dec. 12, 1933

1,939,174

UNITED STATES PATENT OFFICE 1,939,174

PRODUCTION OF ALKALI METAL SULPHATES

Oskar Kaselitz, Berlin, Germany

No Drawing. Application June 11, 1932, Serial No. 616,757, and in Germany September 1, 1931

4 Claims. (Cl. 23—121)

My invention relates to the production of alkali metal sulphates, more particularly by treating double salts containing alkali metal sulphates for the recovery of the latter in a substantially pure form.

In recovering potassium sulphate from potassium magnesium sulphate ($K_2SO_4.MgSO_4.6H_2O$), this salt is as a rule treated with water and potassium chloride in such proportions that, on cooling or on evaporating and cooling the solution, potassium sulphate is precipitated and a solution chiefly containining magnesium chloride is obtained. The precipitate always contains some chlorides, which are undesirable in commercial potassium sulphate and can be removed only partly by washing with saturated potassium sulphate solutions, particularly so, if the precipitate is finely divided and sludgy.

The present invention enables me to recover alkali metal sulphates from double salts containing same in a particularly pure form which fully answers commercial requirements. It is applicable to all double salts containing an alkali metal sulphate and another sulphate which is more readily soluble in water than the alkali metal sulphate either at normal or at an elevated or at an artificially lowered temperature. This means that the temperature in question must range between the cryohydric point and the normal boiling point of the solution formed thereby.

A specific example of such a double salt is the potassium magnesium sulphate mentioned above, which I heat with water or with a more or less saturated potassium sulphate solution in such proportions and to such a temperature that a solution almost or altogether saturated with regard to magnesium sulphate is obtained. The temperature to which the watery mixture must be heated, depends from the proportion of the water and the double salt, an elevated temperature and a correspondingly low water contents of the mixture being preferred. If all the magnesium sulphate is dissolved, there remains over a more or less considerable solid residue which consists of substantially pure potassium sulphate. On separating this salt from the mother liquor and washing it with small quantities of water or potassium sulphate solution, a product of great purity and which is altogether free from chlorides is obtained.

The mother liquor, which chiefly consists of magnesium sulphate, but also contains some potassium salt, may be further treated with potassium chloride to recover all the potassium salt in the form of additional, although less pure potassium sulphate.

In practising my invention I may for instance proceed as follows:

Example 1

100 parts by weight of the double salt $$K_2SO_4.MgSO_4.6H_2O$$

and 86.7 parts of an impure washing liquor containing 12.06% $K_2SO_4$ (corresponding to saturation at a temperature of about 25° C.) are mixed and heated to about 90° C. On separating the mother liquor from the solid residue there are obtained 25.16 parts pure potassium sulphate and a solution of 27.44 parts potassium sulphate and 29.89 parts magnesium sulphate in 104.24 parts water.

While I have given above a specific example illustrating the treatment of potassium magnesium sulphate, it will be understood that my invention is not limited thereto, but is also applicable to the treatment of such other double salts and double sulphates which are "incongruently" soluble in water, i. e. double salts in which the alkali metal sulphate component is less soluble in water than the other component at at least one practically feasible temperature of the solution. In treating for instance vanthoffit ($MgSO_4.3Na_2SO_4$) I make use of the particularly low solubility of sodium sulphate dekahydrate ($Na_2SO_4.10H_2O$), at temperatures near 0° C. The same applies to other double salts containing sodium sulphate such as for instance the double salt $ZnSO_4.Na_2SO_4.4H_2O$.

Example 2

100 parts of the double salt $ZnSO_4.Na_2SO_4.4H_2O$ and 194.7 parts water are mixed at a temperature of about 0° C. On separating the mother liquor from the residue there are obtained 136.6 parts sodium sulphate dekahydrate and a solution of 42.98 parts $ZnSO_4$ and 8.46 parts $Na_2SO_4$ in 106.64 parts water.

The double salt $FeSO_4.Na_2SO_4.4H_2O$ may be treated in a similar way as described with reference to Example 2.

If the sodium sulphate is combined with a sulphate particularly soluble in hot water, I may, however, also heat such double salts with the required quantities of water as illustrated by the following example:

*Example 3*

100 parts of the double salt $$Na_2SO_4(NH_4)_2SO_4.4H_2O$$

are heated with 23.5 parts water to 80° C., and on separating the solids from the mother liquor there are obtained 25.3 parts sodium sulphate and a solution of 15.70 parts sodium sulphate and 38.18 parts ammonium sulphate in 44.27 parts water.

The proportion of alkali metal sulphate which remains in the mother liquor, depends from its solubility in water at the temperature at which the separation of the mother liquor from the solid residue is accomplished, and from the proportion of the water employed. The best yields are consequently obtained, if the quantity of water is hardly in excess of the quantity required for the complete dissolution in the sulphate component of the double salt other the alkali metal sulphate, and if the temperature is controlled accordingly.

My invention is also applicable in such cases where the solution obtained at operating temperatures is at an equilibrium not only with the two sulphates and the double salt, but also with mixed crystals of the two sulphates. In such a case the alkali metal sulphate obtained is mixed with some of the other sulphate, but is nevertheless substantially free from foreign acid radicals such as the chloride radical, which is particularly undesirable in commercial alkali metal sulphates.

Various changes may be made in the details disclosed in the foregoing specification without departing from the invention or sacrificing the advantages thereof.

In the claims affixed to this specification no selection of any particular modification of the invention is intended to the exclusion of other modifications thereof and the right to subsequently make claim to any modification not covered by these claims is expressly reserved.

I claim:—

1. The method of recovering alkali metal sulphate from a double sulphate containing said alkali metal sulphate in combination with another sulphate, which is more readily soluble in water at a temperature ranging between the cryohydric point and the normal boiling point of its solution, comprising mixing said double sulphate at such temperature with water in such proportions that said other sulphate is completely dissolved and a substantially saturated solution of said other sulphate is formed, and separating the solution thus obtained from the solid residue.

2. The method of producing potassium sulphate comprising heating the double salt $K_2SO_4.MgSO_4.6H_2O$ with a limited amount of water to obtain complete dissolution of the magnesium sulphate in the form of a substantially saturated solution, and separating the mother liquor thus obtained from the solid potassium sulphate which remains over.

3. The method of producing potassium sulphate comprising heating about 100 parts by weight of the double salt $K_2SO_4.MgSO_4.6H_2O$ with about 87 parts of a washing liquor containing about 12% $K_2SO_4$, heating the mixture to about 90° C., and separating the mother liquor from the solid potassium sulphate which remains over.

4. The method of producing sodium sulphate from double salts containing same in combination with another sulphate more readily soluble than sodium dekahydrate in water at low temperature, comprising mixing such double salt with a limited quantity of water, cooling the mixture to such low temperature and separating the mother liquor from the solid sodium sulphate dekahydrate which remains over.

OSKAR KASELITZ.